JOHN M. BATCHELDER.
Ruler.
No. 127,949.                                         Patented June 18, 1872.
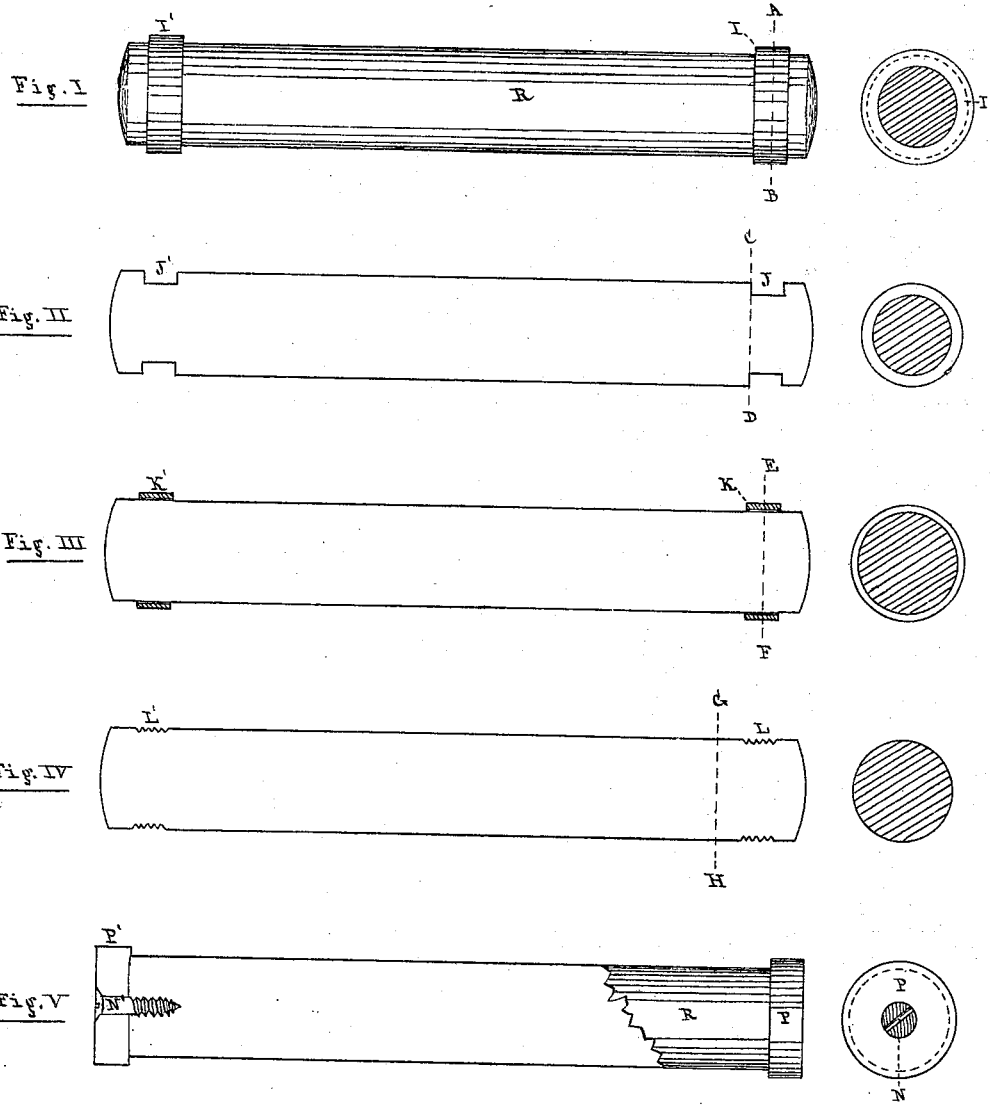

127,949

UNITED STATES PATENT OFFICE.

JOHN M. BATCHELDER, OF CAMBRIDGE, MASSACHUSETTS.

IMPROVEMENT IN RULERS.

Specification forming part of Letters Patent No. 127,949, dated June 18, 1872; antedated June 13, 1872.

*To all whom it may concern:*

Be it known that I, JOHN M. BATCHELDER, of Cambridge, in the county of Middlesex and State of Massachusetts, have invented a new and useful Improvement in Round Rulers; and I do hereby declare that the following specification is a full, clear, and exact description of the same, reference being had to the accompanying drawing.

Figure I is a view of the ruler, with section on line A B; Fig. II, longitudinal section and cross-section on line C D; Fig. III, longitudinal section and cross-section on line E F; Fig. IV, longitudinal section and cross-section on line G H; Fig. V, section, front view, and end view.

The objection to the use of the common round ruler is that it is liable to slip upon the paper, and that when used for ink-ruling with a common pen, the ink that may chance to be left upon the ruler is distributed upon the paper at the next revolution. These objections are obviated by the present improvement, the surface of the ruler being prevented from touching the paper by a ring or disk of India rubber placed at each of its ends. The surface of the rubber rings or disks rests upon the paper and affords a firm support, which is at the same time slightly elastic.

The form of the wooden part of the ruler is shown in Fig. II, the grooves J J' being intended for the reception of the elastic rubber rings. These rings I I' are seen in place in Fig. I, projecting about one-sixteenth of an inch beyond the surface of the ruler. The rings I I' should be about one-eighth of an inch thick, as shown in the cross-section on the line A B.

I prefer to use the rings as above described, and represented in Figs. I and II; but they may also be made as in Fig. III, the rings K K' being slipped upon the ends of a cylindrical ruler, in which case they are to be about one-sixteenth of an inch thick, as in the cross-section on the line E F.

To prevent the rings from slipping, the ruler may have several small indentations or grooves, as at L L', Fig. IV.

Instead of the rings, two round disks, P P', of India rubber may be used, as in Fig. V, one being fastened to each end of the ruler by the screws N N'. These disks are of larger diameter than the ruler, as represented in the end view, Fig. V.

What I claim, and desire to secure by Letters Patent, is—

A round ruler, having at or near its ends rings or disks of India rubber, substantially as herein described.

JOHN M. BATCHELDER. [L. S.]

Witnesses:
  FRANKLIN HUNT,
  HENRY S. ROWE.